Dec. 26, 1961        H. J. CALDERHEAD ETAL        3,015,066
    COAXIAL ELECTRICAL LINE DEVICE HAVING RIGIDLY
              ATTACHED METER CASE
         Filed March 8, 1956
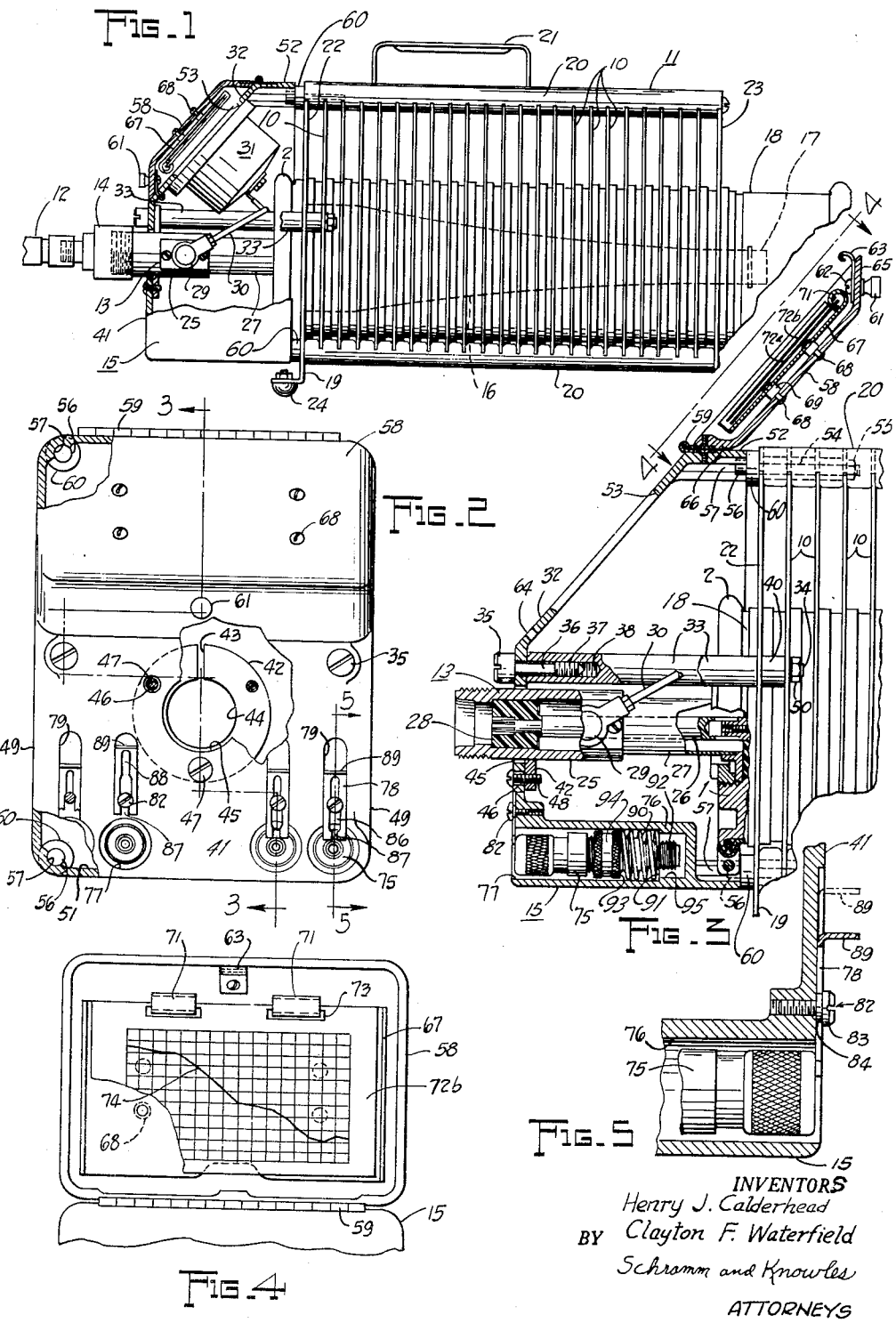
INVENTORS
Henry J. Calderhead
Clayton F. Waterfield
BY
Schramm and Knowles
ATTORNEYS

United States Patent Office 3,015,066
Patented Dec. 26, 1961

3,015,066
COAXIAL ELECTRICAL LINE DEVICE HAVING RIGIDLY ATTACHED METER CASE
Henry J. Calderhead, Euclid, and Clayton F. Waterfield, Cleveland, Ohio, assignors to Bird Electric Corporation, a corporation of Ohio
Filed Mar. 8, 1956, Ser. No. 570,301
10 Claims. (Cl. 324—156)

This invention relates to radio frequency measurement and to apparatus for use in radio frequency systems for testing, and relates especially to meter mounting arrangements for such apparatus.

An object of the invention is to provide improved radio frequency absorption type wattmeters with indicating meter units mounted in unitary structure with a termination unit.

In testing, tuning and otherwise adjusting high frequency radio transmitters and radio frequency generators, it is desirable to make power measurements and to absorb the power during such measurements to avoid interference and radiation; and for convenience of use in the field and avoidance of an excessive burden of equipment it is desirable that such wattmeters be versatile as to the range of power and frequency ratings, and that a minimum number of separate unitary elements be required for handling or transfer.

Moreover, convenient interchangeability of metering elements and secure storage facilities therefor are a prerequisite to utilization of such equipment in the field as well as ruggedness, durability and reliability.

A further object of the invention is to provide a multirange thermocouple wattmeter in which spare thermocouple units of different power capacities for different ranges may be stored securely but easily and quickly removed from or replaced in the storage compartments.

Still another object of the invention is to provide a direct-current measuring unit in a unitary assembly with a load unit for radio frequency wattmeters.

Other and further objects, features and advantages of the invention will become apparent as the description proceeds.

In carrying out the invention in accordance with a preferred form thereof, an indicating instrument housing for a wattmeter unit is provided which may form a component of a high frequency radio transmission line system composed of a plurality of separate elements which may be connected together and to the output of a radio frequency generator or a high frequency radio transmitter.

The apparatus is designed for use with transmitters and generators operating in the radio frequency ranges where coaxial lines are employed. In order to avoid reflections, or power losses, or inability to absorb the power of the transmitter in employing such apparatus, a terminating impedance of the horn type is provided including an outer conductor with a tapering inner diameter and a center conductor in the form of a resistor rod such that the characteristic impedance remains the same independent of variations in transmitter frequency.

The wattmeter unit and instrument housing described herein is especially adapted for use in high frequency power measuring systems of the type disclosed in the copending application of Henry J. Calderhead, Herbert H. Heller, and Clayton F. Waterfield, Serial No. 534,226, filed September 14, 1955, now United States Patent 2,946,005 dated July 19, 1960, showing common subject matter.

A direct-current measuring unit with a unique deflecting-instrument housing is attached to the input end of a termination unit having a coaxial line fitting by means of which it may be connected to a transmitter or generator through coaxial line elements. The thermo-electric principle is employed for the measurement of power and a millivoltmeter responsive to thermoelectric voltage constitutes the indicating or deflecting instrument calibrated in radio-frequency power.

A better understanding of the invention will be afforded by the following detailed description considered in conjunction with the accompanying drawings forming a part of the specification, in which:

FIG. 1 is an elevation of an absorption type coaxial line wattmeter with the coaxial line thermocouple unit broken away in part but illustrating the manner of connection to coaxial line elements leading to a radio frequency generator or transmitter;

FIG. 2 is an elevation of the millivoltmeter mounting unit employed in the absorption type wattmeter of FIG. 1;

FIG. 3 is a view of a vertical cross section of the apparatus of FIG. 2 represented as cut by a broken plane 3—3 with the meter cover of the apparatus of FIG. 2 lifted instead of in the position shown in FIG. 2;

FIG. 4 is a fragmentary view of the apparatus of FIG. 1 illustrating the interior of the meter cover and exposing one of the meter calibration chart cards secured therein for selective exposure of one of a plurality of chart cards; and FIG. 5 is a detail sectional view of a portion of the apparatus of FIG. 2 showing a mounting arrangement of sliding clamps for securing spare thermocouple elements.

Like reference characters are utilized throughout the drawings to designate like parts.

As represented in FIG. 1, in measuring the power of a transmitter or radio frequency generator, not shown, a tapering horn type termination unit 11 is provided for connection to the transmitter through a fragmentarily illustrated coaxial line thermocouple unit 12. A direct-current coaxial line measuring unit 13 is interposed between the termination unit 11 and the thermocouple unit 12 with a transition element or adaptor 14 interposed between the direct current coupling or line unit 13 and the thermocouple unit 12 in order that fine wire thermocouples may be employed without undue change in characteristic impedance of parts of the line. The coaxial line extension or direct-current coupling unit 13 is mounted in or comprises one component of a unitary structure which also includes the termination unit 11, a millivoltmeter indicator 31 and a housing or mounting frame 15.

The termination unit 11 comprises an elongated cylindrical ceramic rod or tube having coated thereon a film type resistor, not shown, mounted coaxially within an outer conductor horn or resistor housing 16 tapering to a minimum diameter at terminal end 17. This termination resistor assembly is coaxial with the line extension 13 and is mounted with a tank 18 containing a suitable insulating fluid or coolant as described in greater detail in the said copending application of Calderhead, Heller, and Waterfield.

The termination unit 11 and the direct current or line extension unit 13 are mounted rigidly together as a single structural unit provided with feet 19, and a carrying handle 21 having depending arms received on pins fast in two of a number of intermediate rectangular cooling fins 10. Each of the four corners of each of the cooling fins is received in a transverse slot of one of the four fin-spacing bars 20. End fins or plates 22 and 23 are provided with lower ends extended to form the feet 19, preferably bent over to receive resilient pads 24.

The coaxial line extension unit 13 includes an outer tubular conductor 25 and an inner conductor rod 26 (FIG. 3). The outer conductor 25 may comprise a thin wall tubing portion 27 composed of stainless steel with a low thermal conductance and high mechanical strength.

An insulator bushing 28 is provided for supporting and centering the left hand end of the inner conductor rod 26 of the unit 13, the other end being suitably supported by annular insulating means held coaxially in circular closure member 1 disposed across the open end of the cylindrical cooling liquid tank 18. The end closure 1 is held against and sealed to the flanged end of the tank 18 by ring clamp 2, the tank end projecting through a circular opening in and being secured to end fin or plate 22. A lateral direct-current connector unit 29 for a direct-current concentric line 30 is secured to the central portion of the outer surface of the outer conductor 25, and a lateral opening, not shown, is provided in the outer conductor 25 to accommodate a conventional high frequency choke connection to the center conductor rod 26.

A direct-current millivoltmeter or indicator 31 is connected to the connector 29 by the concentric line 30 and is mounted in a circular opening 53 formed in a suitable oblique mounting plate or wall portion 32 of the housing or mounting frame. The frame or housing 15 is secured by fasteners to the outer ends of cantilever studs or posts 33, or the like, and to the plate 22 of the termination unit 11. The supporting posts 33 are secured to the plate 22 and the next adjacent intermediate plate 10 by suitable machine screws or the like 34, spacers 40 between the plates, and nuts 50. The mounting frame 15, in turn, is secured to the outer ends of the posts 33 by cap screws 35 having elongated reduced diameter necks 36 and threads 37 adapted to mate threads in deep sockets 38 formed in the ends of the posts 33. Openings 39 are provided in the front wall 41 of the mounting frame 15 for receiving the reduced diameter necks 36 and are threaded to pass the threaded ends of the screws 35 in order that such cap screws may be retained captive in the openings 39 without danger of loss thereof in case the apparatus should be disassembled in the field.

As explained in greater detail in the said copending application of Calderhead, Heller and Waterfield, the thin walled end 27 of the coaxial line extension unit 13 is supported by the closure member 1 disposed across and extending within the left hand end of the tank 18 of the terminating unit 11.

For steadying or better supporting the projecting or left hand end 25 of the direct current coupling section or coaxial line extension unit 13, a split clamping ring 42 is provided which is in the form of a flat spring metal annulus having a radial through slot 43. Inner circular edge 44 of the split clamping ring 42, normally slightly smaller in diameter than the outside diameter of the outer conductor 25 of the coaxial line unit 13 resiliently embraces the latter.

There is a circular opening 45 in the front wall or face 41 of the meter supporting frame 15 larger than circular opening 44 in the split ring support 42 for receiving the coaxial line unit 13 and the clamping ring 42 is secured to the wall 41 around the opening 45. Three holes 46 spaced around the opening 45 are provided in the casing front wall 41 for receiving cap screws 47 tapped into threaded openings 48 in the split clamping ring 42. Preferably the holes 46 in the wall 41 are larger than the actual diameter of the cap screws 47 and sufficiently larger to provide the annular clearance shown in FIGS. 2 and 3 which permits sliding the clamping ring 42 eccentrically with respect to the hole 45 in order to provide slight adjustment in the position of the clamping ring 42 to accommodate the line unit 13 and prevent stressing the structure in the event of slight misalignment of the unit 13 with respect to the opening 45, which latter, being larger than the ring opening 44 is somewhat larger than the outer diameter of the outside conductor 25 of the unit 13. The latter slightly distends the spring metal ring 42 and is thus circumferentially gripped and supported by the ring.

The meter mounting frame 15 may be in the form of a casting of aluminum or the like, having side walls 49, and a bottom wall 51 intersecting and integral with the front wall or face 41. Although an opening may be provided in a horizontal top wall or the vertical front wall 41 to receive the millivoltmeter 31, preferably a sloping wall is provided constituting the meter mounting plate 32 which may be integral with the front wall 41 and the side walls 49 as well as a shortened top wall 52. An opening 53 is provided in the sloping wall or the meter mounting plate 32 to receive the millivoltmeter 31 in a conventional manner.

The plate 22 of the termination unit 11 is secured to spacing bars 20 by studs 54 and nuts 55. The studs are of special shouldered form with cylindrical heads 60 and reduced-diameter lugs or end buttons 56 thereon to facilitate locating the meter mounting frame 15 with respect to the unit 11 and for this purpose the meter mounting frame 15 is formed with sockets 57 adapted to receive the button portions 56 of the studs 54 when the meter mounting frame 15 is secured in position by means of the cap screws 35, secured in the posts 33 which are in turn secured to the plate 22 by screws 34.

For protecting the face of the millivoltmeter 31 against damage during transit or storage, the meter mounting frame 15 is preferably provided with a lid or cover 58 having a hinge 59 at the upper end of the meter mounting plate 32.

The cover 58 is provided with a knob or handle 61 in the form of a nut engaging a cap screw 62 for clamping or securing a spring or snap latch 63 adapted to engage a slot 64 at the lower edge of the meter mounting plate 32.

As illustrated in FIG. 3 the cover 58 comprises a main wall with integral sloping end walls 65 and 66, making such an angle (135° as shown) with the main surface of the cover 58 as to lie along the top wall 52 and the front wall 41, respectively, of the meter mounting frame 15 when the cover 58 is in closed position as illustrated in FIG. 1. The wall 66 on the other hand is horizontal and lies along the top wall 52 of the mounting frame 15 when the cover 58 is in the open position illustrated in FIG. 3. Moreover, the cover 58 is then parallel to the meter mounting plate 32 to form substantially a continuation thereof, since as shown the mounting plate has 45° slope, making an angle of 135° with the vertical wall 41.

Accordingly the cover plate 58 may serve not only as a protective cover for the meter 31 and a dust excluding lid, but also as a calibration-chart mount. There is a calibration-chart holder 67 secured to the cover 58 by bolts 68 and spacing collars 69. The chart holder 67 is formed with a spring loop 71, preferably being composed of suitable light, strong material such as light sheet metal or formable plastic, and a plurality of calibration chart cards 72a, 72b are provided, each of which has slots 73 formed therein, snapped under the spring loop 71 and linking the same so that the calibration charts 72a, 72b are pivotally mounted or hinged within the cover 58. When the cover 58 is hinged at the upper edge of the meter mounting plate 32, the cover 58 is arranged with the chart holder loop 71 also at the upper edge of the opened cover, so that the charts 72a, 72b are held in flat position against the chart holder 67. Whichever chart is exposed may be viewed simultaneously with the viewing of the face of the meter 31 for effecting immediate calibration of the meter reading.

It will be understood that such charts 72a, 72b are provided with calibration curves 74, a different calibration curve being provided for each interchangeable thermocouple element 75 which is included with the equipment for mounting in the thermocouple coaxial line unit 12. For example, with four interchangeable thermocouples employed there are two chart cards 72a and 72b each with calibration curves 74 drawn on both sides thereof so that with the chart cards 72a and 72b in the position shown in FIG. 3 the top surface of the uppermost card 72a is readable; whereas by rotating the upper card 72a around the loop 71 so as to cause it to lie against the sloping wall 65 of the cover 58, both the back of one chart card 72a and the face of the lower card 72b are visible. Of course, with the lower card 72b turned up, the back of it is visible so that four different calibration curves on independent chart sheets are provided. It will be understood that the invention is not limited to a pre-determined number of chart cards mounted on the chart holder 67.

For storing interchangeable thermocouple elements 75 which may be mounted in the coaxial line unit 12, fragmentarily shown, the meter mounting frame 15 is formed with a plurality of cells, chambers or sockets 76, each in hollow cylindrical form, lying against the lower wall 51 of the unit 15 in parallel coplanar relation to one another and having coplanar openings 77 in the front wall 41 of the unit 15. The cells 76 are each dimensioned to receive a thermocouple element 75 snugly; and for locking the elements 75 in place, slide clamps 78 are provided.

The front wall 41 of the unit 15 is formed with vertical parallel slide grooves 79, each aligned with one of the cell openings, each of a depth substantially equal to the thickness of the slide clamp 78 which it receives, each of sufficient width to provide a slide fit for such slide clamp, and each of greater length than such slide clamp or detent so that each slide clamp 78 may be moved from the thermocouple element locking position illustrated in FIGS. 3 and 5 to the thermocouple freeing position illustrated by one of the raised slides in FIG. 2.

For securing the slide clamps 78 in the slide grooves 79, shoulder screws 82 are provided as illustrated in FIGS. 3 and 5. Each shoulder screw 82 has a head 83, a shank portion 84 of smaller diameter than the head 82 but greater diameter than threaded shank portion 85 screwed into the front wall 41 of the unit 15.

In order to receive the shank portions 84 of the shoulder screws 82, the slide clamps 78 are formed with slots each having a central relatively wide portion 86 of slightly less width than the diameter of the screw shank portion 84 when unsprung, with a reduced width end portion or end slot 87, and, preferably, also a reduced width portion or yoke slot 88, whereby the sliding movement of the slide clamp 78 is limited by stops at the ends of the wide slot portion 86 and the slide clamp 78 may engage the shank portion 84 resiliently to hold the slide clamp 78 in either open or closed position. To facilitate opening or closing the slide clamps 78, they are provided with bent over ends 89 serving as handles. As illustrated in FIG. 5 each of the slide clamps 78 is slidable between a lowered or advanced retaining position in which the handle 89 is shown in full lines and a raised or retracted releasing position in which the handle 89 is shown in dashed lines. Helical coil compression springs 90 are received in the sockets 76 and are sufficiently large in diameter to receive the base or threaded ends 92 of the thermocouples 75 as the latter are inserted into the sockets. Each spring is compressed between socket bottom or shoulder 91 and annular radial shoulder 93 on the end of knurled collar 94 of the received thermocouple. The springs are suitably held captive in the sockets when the thermocouples are released or removed as by the friction fit of a slightly enlarged end turn on each spring in the socket or a reduced diameter inner end portion 95 of each socket. These springs hold the thermocouples firmly against the lowered slide clamps 78, eliminating rattling and frictionally resisting withdrawal of the slide clamps from retaining positions across the ends of the thermocouples. When a slide clamp is raised the released themocouple is projected axially out the open end 77 of the socket by the force of the spring 90, thus placing the thermocouple in a convenient position for grasping by the operator. Furthermore, the projection of a thermocouple by the spring unless the slide clamp is lowered across the end of the received thermocouple element insures that the operator will positively advance the slide clamp to retaining position each time a thermocouple is replaced since the projected thermocouple constitutes a visible signal that the slide clamp is retracted.

In accordance with the provisions of the patent statutes, the principle of operation of the invention has been described together with the apparatus now believed to represent the best embodiment thereof, but it is to be understood that the apparatus shown and described is only illustrative and that the invention may be carried out by other arrangements.

What we claim and desire to secure by Letters Patent of the United States is:

1. In an electrical indicating instrument a meter mounting unit comprising a hollow housing frame having substantially vertical front and side walls,
    the side walls being spaced from one another and intersecting and joined to the front wall,
    a substantially horizontal top wall intersecting and joined to the side walls,
    and an oblique front wall intersecting and joined to the vertical front and the horizontal top walls and making an obtuse angle with each,
    said oblique wall also intersecting and joined to the side walls, said oblique wall being formed with an opening, a meter inside the housing frame and disposed across the oblique wall opening to be viewed through the latter,
    a cover,
    means hinging the cover to the housing frame for swinging movement about a horizontal axis adjacent the intersection of the oblique and the top walls between a lower closed position in which the cover is disposed across the meter viewing opening in the oblique wall and an upper open position in which the cover is wholly above the housing frame to expose the meter through said opening and in which the cover is inclined rearwardly from the hinge axis, said cover being dished in the provision of a shallow chamber overlying the oblique wall in the closed position of the cover and having an external surface engageable with the top wall to limit the movement of the cover and determine the angle of inclination of the cover in the open position,
    a plurality of calibration cards disposed in the cover chamber, and
    means pivotally mounting such cards on the cover to swing about an axis parallel to the hinge axis and adjacent that edge of the cover remote from the hinge axis, whereby in swinging the cover from closed to open position the pivot axis of the cards shifts from the lower portion to the upper portion of the cover chamber, and the pivotal mounting means in the open condition of the cover preventing swinging of the cards across the meter viewing opening in the oblique wall while permitting swinging of the cards to raised positions in which they project out of the cover chamber and above the pivot axis of the cards.

2. In an electrical indicating instrument a meter mounting unit comprising a hollow housing frame having substantially vertical front and side walls,
    the side walls being spaced from one another and intersecting and joined to the front wall,
    a substantially horizontal top wall intersecting and joined to the side walls,
    and an oblique front wall intersecting and joined to the vertical front and the horizontal top walls and making an obtuse angle with each,
    said oblique wall also intersecting and joined to the side walls, said oblique wall being formed with an opening, a meter inside the housing frame and disposed across the oblique wall opening to be viewed through the latter,
    a cover,
    means hinging the cover to the housing frame for swinging movement about a horizontal axis adjacent the intersection of the oblique and the top walls between a lower closed position in which the cover is disposed across the meter viewing opening in the oblique wall and an upper open position in which the cover is wholly above the housing frame to expose the meter through said opening and in which the cover is inclined rearwardly from the hinge axis, said cover being dished in the provision of a shallow chamber overlying the oblique wall in the closed position of the cover and having an external surface engageable with the top wall to limit the movement of the cover and determine the angle of inclination of the cover in the open position, a generally flat card holder, a plurality of calibration cards, means pivotally mounting such cards on the card holder, means mounting the holder and the cards on the cover as a unit with the cards arranged to swing about an axis parallel to the hinge axis and adjacent that edge of the cover remote from the hinge axis, whereby in swinging the cover from closed to open position the pivot axis of the cards shifts from the lower portion to the upper portion of the cover chamber, and the pivotal mounting means in the open condition of the cover preventing swinging of the cards across the meter viewing opening in the oblique wall while permitting swinging of the cards to raised positions in which they project out of the cover chamber and above the pivot axis of the cards.

3. In an electrical indicating instrument a meter mounting unit comprising a hollow housing frame having substantially vertical front and side walls, the side walls being spaced from one another and intersecting and joined to the front wall, a substantially horizontal top wall intersecting and joined to the side walls, and an oblique front wall intersecting and joined to the vertical front and the horizontal top walls and making an obtuse angle with each, said oblique wall also intersecting and joined to the side walls, said oblique wall being formed with an opening, a meter inside the housing frame and disposed across the oblique wall opening to be viewed through the latter, a cover, means hinging the cover to the housing frame for swinging movement about a horizontal axis adjacent the intersection of the oblique and the top walls between a lower closed position in which the cover is disposed across the meter viewing opening in the oblique wall and an upper open position in which the cover is wholly above the housing frame to expose the meter through said opening and in which the cover is inclined rearwardly from the hinge axis, said cover being dished in the provision of a shallow chamber overlying the oblique wall in the closed position of the cover, said cover having a planar open face and also having in its closed position a top marginal portion substantially in the plane of the horizontal top wall, and a bottom marginal portion substantially in the plane of the vertical front wall, means limiting the hinging movement to locate the cover in open position with its open face substantially coplanar to the oblique wall, a plurality of calibration cards disposed in the cover chamber, and means pivotally mounting such cards on the cover.

4. In an electrical indicating instrument a meter mounting unit comprising a hollow housing frame having substantially vertical front and side walls, the side walls being spaced from one another and intersecting and joined to the front wall, a substantially horizontal top wall intersecting and joined to the side walls, and an oblique front wall intersecting and joined to the vertical front and the horizontal top walls and making an obtuse angle with each, said oblique wall also intersecting and joined to the side walls, said oblique wall being formed with an opening, a meter inside the housing frame and disposed across the oblique wall opening to be viewed through the latter, a cover, means hinging the cover to the housing frame for swinging movement about a horizontal axis adjacent the intersection of the oblique and the top walls between a lower closed position in which the cover is disposed across the meter viewing opening in the oblique wall and an upper open position in which the cover is wholly above the housing frame to expose the meter through said opening and in which the cover is inclined rearwardly from the hinge axis, said cover being dished in the provision of a shallow chamber overlying the oblique wall in the closed position of the cover, said cover having a planar open face and also having in its closed position a top marginal portion substantially in the plane of the horizontal top wall, and a bottom marginal portion substantially in the plane of the vertical front wall, means limiting the hinging movement to locate the cover in open position with its open face substantially coplanar to the oblique wall, a plurality of calibration cards disposed in the cover chamber and means pivotally mounting such cards on the cover to swing about an axis parallel to the hinge axis and adjacent that edge of the cover remote from the hinge axis, whereby in swinging the cover from closed to open position the pivot axis of the cards shifts from the lower portion to the upper portion of the cover chamber, and the pivotal mounting means in the open condition of the cover preventing swinging of the cards across the meter viewing opening in the oblique wall while permitting swinging of the cards to raised positions in which they project out of the cover chamber and above the pivot axis of the cards.

5. In an instrument comprising a plurality of electrical components connected together in an indicating circuit, a main frame having a supporting wall, means mounting one of the circuit components in the main frame in fixed relation to and on one side of the supporting wall, a rigid tubular conductor connected at one end to said one component and projecting outwardly from the other side of said supporting wall, a hollow housing frame, means detachably securing the housing frame to the main frame in predetermined position for facile demounting and remounting of the housing frame from and onto the main frame, the housing frame having a front wall generally spaced from the supporting wall of the main frame, said front wall being formed with an opening receiving and through which protrudes the projecting conductor, said front wall opening being larger than the portion of the projecting conductor received therein in the provision of an annular separating clearance, an element separate from and resiliently embracing the projecting conductor in supporting contacting relation at a point spaced outwardly from the supporting wall of the main frame, and means attaching the support element to said front wall of the housing frame for movement therewith longitudinally of and for lateral adjustment universally in a plane transverse to the axis of the projecting conductor, said attaching means being adapted to clamp the support element rigidly to the front wall in adjusted position, the rigidly projecting tubular conductor being adapted to move laterally as required in assembly in and relative to said front wall opening and longitudinally in and relative to the support element in shifting the support element to adjusted position for clamping by the attaching means to accommodate slight deviations in concentricity of the rigidly projecting tubular conductor relative to the center of the opening in the front wall of the housing frame and in spacing of the support element from the supporting wall of the main frame.

6. In an instrument comprising a plurality of electrical components connected together in an indicating circuit, a main frame having a front wall member and an axis substantially normal thereto; means mounting one of the circuit components in the main frame; a hollow housing frame having an open rear side, having a peripheral edge about and defining and a front wall opposite said open side; said housing frame being disposed with its open side in confronting relation to and its front wall generally spaced from the wall member of the main frame; a plurality of lugs on and distributed about one of the frames adjacent its periphery, said lugs and the other frame being formed for mutually interfitting relationships at a plurality of points each adjacent said peripheral edge locating the frames laterally with respect to said axis in predetermined relative positions; means on the projecting lugs engaging the said other frame and locating the frames relative to one another along said axis with the housing frame edge spaced from the main frame about substantially the entire periphery of said open rear side to permit free air circulation through the peripheral space into and out of the housing frame; post means fast to the main frame, projecting rigidly outwardly from the wall member and constituting a cantilever support for the housing frame, said post means extending beyond the lugs, through the open side of the housing frame and into the interior and substantially to the front wall of the latter; means securing the housing frame to the outer end of the cantilever post means and retaining the housing frame in said position; an indicator carried by the housing frame, and conductor means contained substantially wholly within the hollow housing frame electrically connecting said one component of the circuit to the indicator and incorporating the latter in such circuit.

7. In an instrument comprising a plurality of electrical components connected together in an indicating circuit,
a main frame having a wall member;
means mounting one of the circuit components in the main frame;
a hollow housing frame having an open rear side, having a peripheral edge about and defining and a front wall opposite said open side;
said housing frame being disposed with its open side in confronting relation to and its front wall generally spaced from the wall member of the main frame;
lug means on the main frame in distributed relation over said wall member, said lug means projecting from the wall member, interfitting the housing frame adjacent the peripheral edge of the latter and locating the housing frame in predetermined position on the main frame,
stop means engaging the housing frame and spacing the peripheral edge of the housing frame from the wall member of the main frame in stand off relation with a predetermined intervening clearance permitting circulation of air through such clearance into and out of the housing frame through its open side, post means and separable fastener means detachably securing the located housing frame to the main frame for facile demounting and remounting, said post means being cantilevered on the main frame and at its outer end being secured directly to the front wall of the housing frame, an indicator carried by the housing frame, and conductor means contained substantially wholly within the hollow housing frame electrically connecting said one component of the circuit to the indicator and incorporating the latter in such circuit.

8. In an instrument comprising a plurality of electrical components connected together in an indicating circuit,
a main frame having a wall member;
means mounting one of the circuit components in the main frame;
a hollow housing frame having a rear side formed with a generally rectangular opening,
a peripheral edge about said opening, and a front wall opposite said opening,
the housing frame being disposed with said opening in confronting relation to and with said front wall generally spaced from the wall member of the main frame;
a plurality of lugs on and, in distributed relation, projecting from the wall member of the main frame, said lugs being received in the corners of the rectangular opening, said corners constituting sockets locating the housing frame in predetermined position on and relative to the main frame;
post means fast to the main frame, projecting rigidly outwardly from the wall member and constituting a cantilever support for the housing frame, said post means extending beyond the lugs, through the open side of the housing frame and into the interior and substantially to the front wall of the latter;
means securing the housing frame to the outer end of the cantilever post means and retaining the housing frame in said position;
an indicator carried by the housing frame,
and conductor means contained substantially wholly within the hollow housing frame electrically connecting said one component of the circuit to the indicator and incorporating the latter in such circuit.

9. In an instrument comprising a plurality of electrical components connected together in an indicating circuit, a main frame having a wall member; means mounting one of the circuit components in the main frame; a hollow housing frame having an open rear side, having a peripheral edge about and defining and a front wall opposite said open side; said housing frame being disposed with its open side in confronting relation to and its front wall generally spaced from the wall member of the main frame; a plurality of lugs on and, in distributed relation, projecting from the wall member of the main frame, said lugs and the housing frame being formed for mutually interfitting relationships at a plurality of distributed points each adjacent the peripheral edge of the latter and locating the housing frame in predetermined position on the main frame; shoulder means on the projecting lugs engaging the housing frame and determining the spacing of said front wall from said wall member; means securing the housing frame on the main frame in located position for facile demounting and remounting, an indicator carried by the housing frame, conductor means having one end electrically connected to the one component of the circuit, said conductor means projecting into the hollow housing frame through the open rear side of the latter, projecting through the front wall of the housing frame and having another end adapted for facile connection to and disconnection from an electrical transmission line externally of the housing frame, flexible cable means having at its ends electrical connections internally of the housing frame to the indicator and to said conductor means incorporating the indicator in the circuit and providing for demounting of the housing frame and the indicator as a unit while the latter is connected in the circuit, and the electrical connection at one end of the cable comprising readily separatable and reconnectable terminal elements providing for optional disconnection and reconnection of the cable means at said one end to permit complete separation as a unit from the main frame of the demounted housing frame and the indicator.

10. In an instrument comprising a plurality of electrical components connected together in an indicating circuit, a main frame having a wall member;

means mounting one of the circuit components in the main frame;

a hollow housing frame having an open rear side and a front wall opposite said open side;

said housing frame being disposed with its open side in confronting relation to and its front wall generally spaced from the wall member of the main frame;

a tubular rigid conductor connected at one end to said one component and projecting outwardly from the wall member and through the housing frame, means locating the housing frame on the main frame in predetermined position and securing it thereto in such position for facile demounting and remounting, the housing frame front wall being formed with a central opening receiving the projecting conductor with an annular separating clearance, an element closely embracing the projecting conductor in supporting relation at a point spaced outwardly from the wall member of the main frame, said element being movable longitudinally of and relative to the embraced conductor, and means attaching the support element to the housing frame front wall for lateral adjustment universally in a plane transverse to the longitudinal axis of the projecting conductor and clamping the support element to such wall in adjusted position, the lateral adjustment of the support element allowing in assembly limited lateral movement of the rigidly projecting tubular conductor in said annular clearance and relative to the housing frame to accommodate slight lateral displacement of the rigidly projecting tubular conductor relative to the center of the opening in the front wall of the housing frame, and said longitudinal movement of such conductor in and relative to said support element allowing longitudinal shifting of the tubular conductor relative to said front wall to accommodate the support element to the spacing of the front wall from the main frame while obtaining rigid support of such tubular conductor in and by said spaced front wall.

References Cited in the file of this patent
UNITED STATES PATENTS

| | | |
|---|---|---|
| 1,952,695 | Webb et al. | Mar. 27, 1934 |
| 2,147,849 | Leo | Feb. 21, 1939 |
| 2,209,213 | Vernon | July 23, 1940 |
| 2,457,966 | Zaidan | Jan. 4, 1949 |
| 2,464,277 | Webber | Mar. 15, 1949 |
| 2,475,896 | Husted | July 12, 1949 |
| 2,526,901 | Robbins | Oct. 24, 1950 |
| 2,565,900 | Wiley | Aug. 28, 1951 |
| 2,587,677 | Ammlung | Mar. 4, 1952 |
| 2,648,047 | Hollingsworth | Aug. 4, 1953 |
| 2,660,714 | ter Veen | Nov. 24, 1953 |
| 2,857,449 | Akins | Oct. 21, 1958 |
| 2,946,005 | Waterfield et al. | July 19, 1960 |

FOREIGN PATENTS

| | | |
|---|---|---|
| 493,667 | Canada | June 16, 1953 |

OTHER REFERENCES

Topolis article "Electrical Moisture Meter," published in Electrical Review, Oct. 3, 1947 (page 523, Figure 2 relied upon).

War Department Training Manual TM11–1080, Oct. 31, 1944 (page 8, Figure 8 relied upon).